Figure 7:
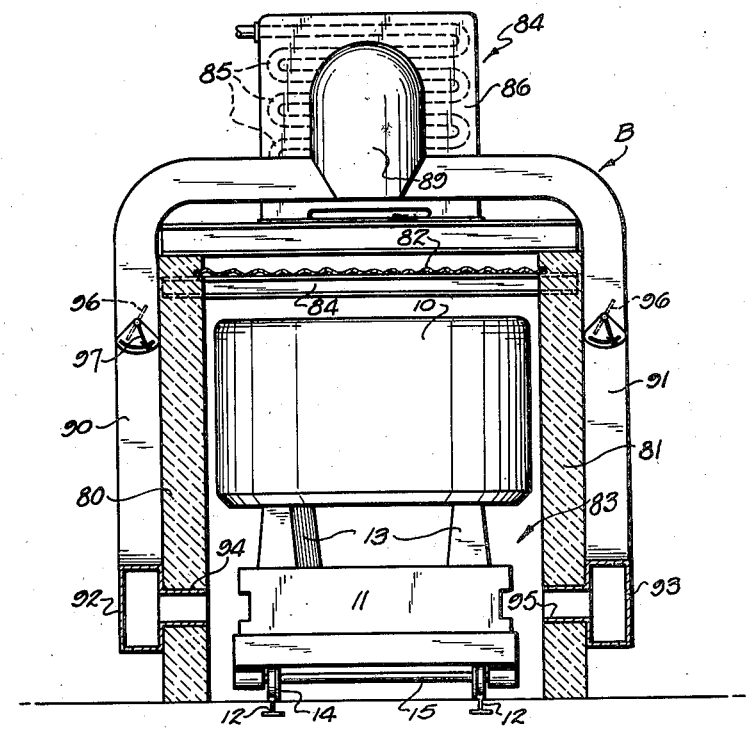

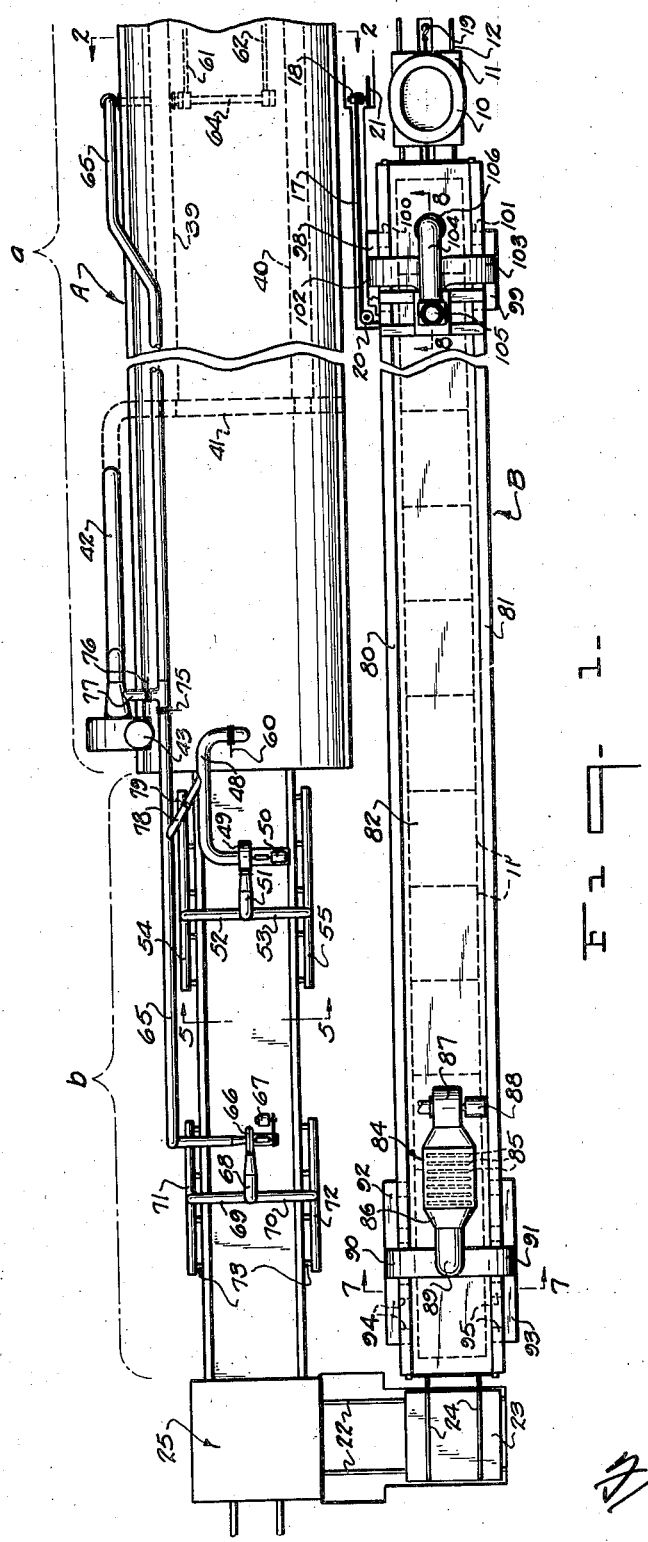

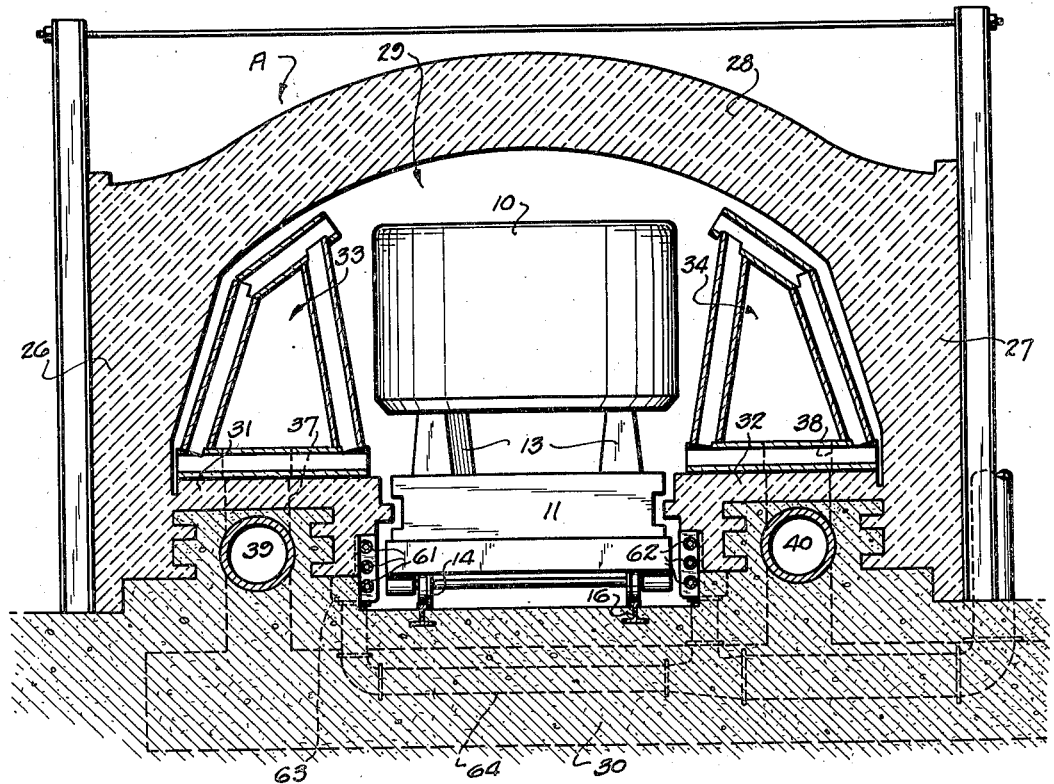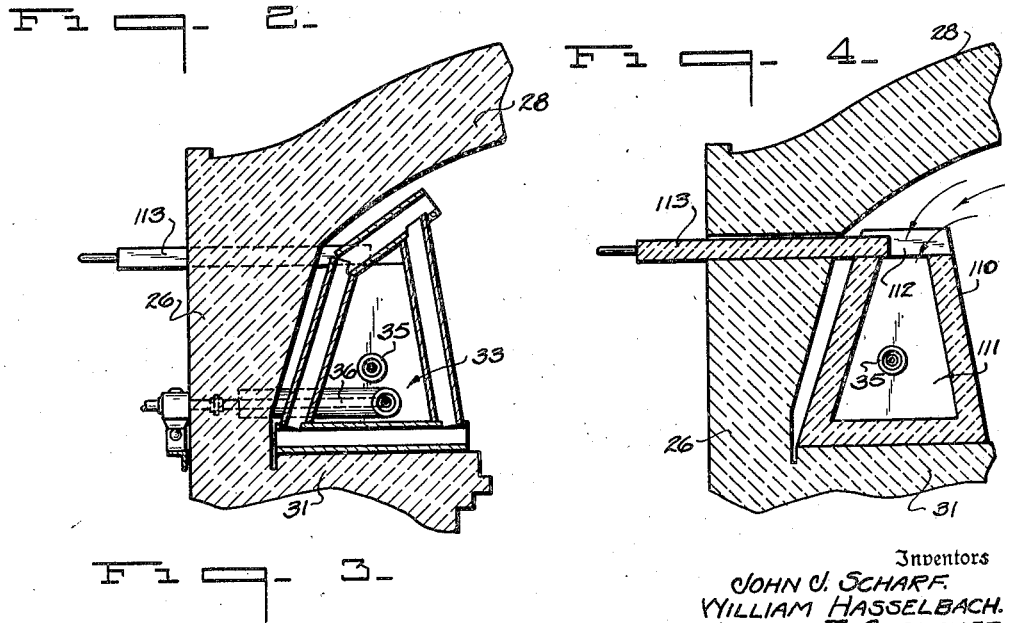

Sept. 8, 1936.　　J. J. SCHARF ET AL　　2,053,497
TUNNEL KILN
Filed Aug. 7, 1934　　4 Sheets-Sheet 3
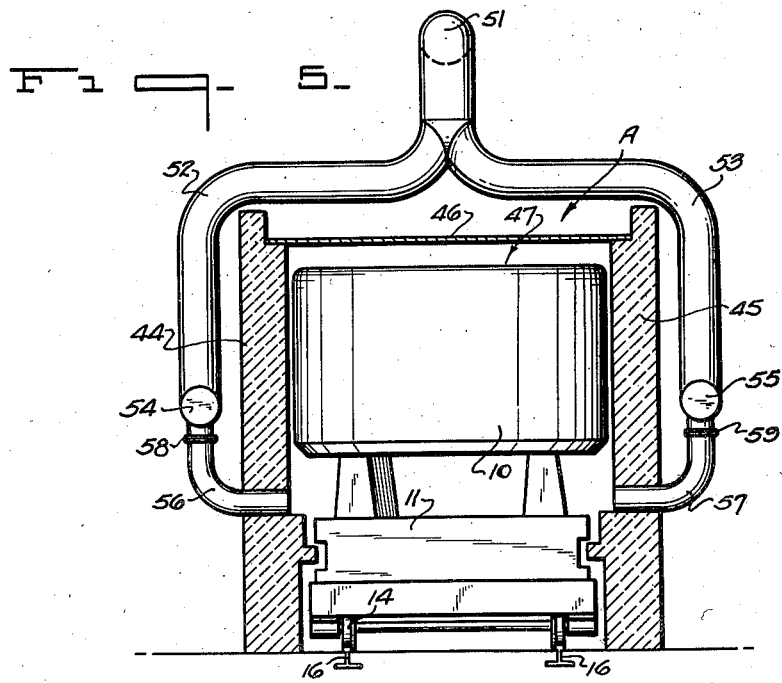
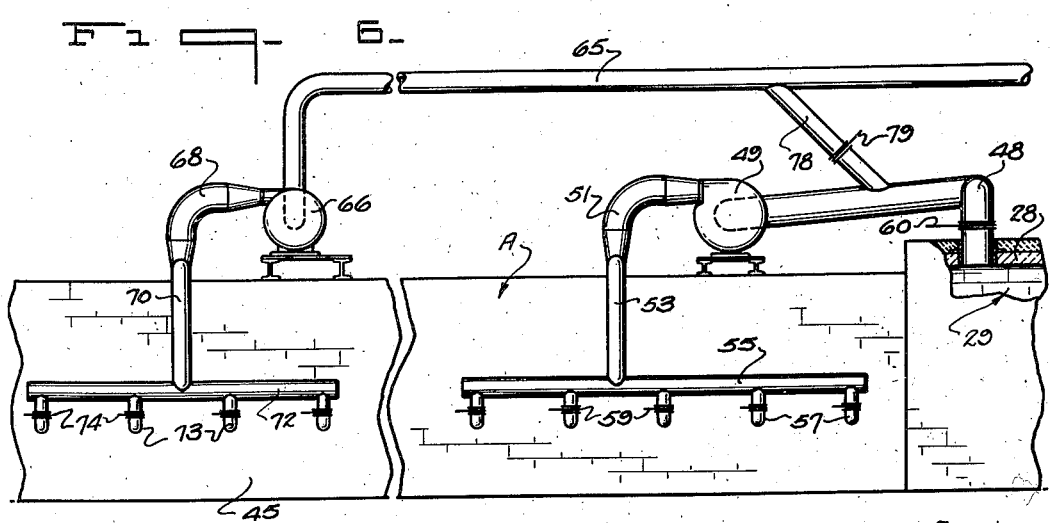
Inventor
JOHN J. SCHARF.
WILLIAM HASSELBACH.
LUTHER T. STROMMER.
By Frank Fraser
Attorney Sept. 8, 1936. J. J. SCHARF ET AL 2,053,497
TUNNEL KILN
Filed Aug. 7, 1934 4 Sheets-Sheet 4

Inventors
JOHN J. SCHARF.
WILLIAM HASSELBACH.
LUTHER T. STROMMER.
By Frank Fraser
Attorney Patented Sept. 8, 1936

2,053,497

UNITED STATES PATENT OFFICE 2,053,497

TUNNEL KILN

John J. Scharf, William Hasselbach, and Luther T. Strommer, Toledo, Ohio, assignors to Libbey-Owens-Ford Glass Company, Toledo, Ohio, a corporation of Ohio Application August 7, 1934, Serial No. 738,774

19 Claims. (Cl. 25—142)

The present invention relates to improvements in tunnel kiln.

While the tunnel kiln herein provided is not restricted to any specific use, it is of utility when employed for the firing or arching of glass melting pots. These pots are formed of a refractory material and, after firing, are adapted to be placed in a glass melting furnace and to have molten glass produced therein. In view of the exceedingly high temperatures to which these pots are subjected during the melting of the glass, it is essential that the firing treatment thereof be such as to prepare them to withstand this intense heat.

An important object of the invention is the provision of an improved construction of tunnel kiln wherein the firing of the pots or other articles being treated will be achieved in a thorough and efficient manner and also wherein the said pots or other articles may be gradually brought to the desired maximum temperature without danger of breaking, cracking, or weakening the same.

Another object of the invention is the provision of an improved tunnel kiln construction comprising a primary tunnel structure wherein the maximum firing temperatures are attained and a preheating tunnel structure through which the pots or other articles being treated are first passed and gradually raised to a desired prepassed and gradually raised to a desired predetermined temperature prior to being introduced into the primary tunnel structure.

Another object of the invention is the provision of an improved tunnel kiln construction of the above character wherein the primary tunnel structure includes a high temperature or firing zone and an auxiliary heating zone through which the pots or other articles pass before entering the said firing zone, together with means for heating said firing zone, and means for utilizing a portion of such heat to assist in heating the auxiliary heating zone.

Another object of the invention is to provide, in a tunnel kiln of the above character, a preheating tunnel structure of novel and improved construction wherein the pots or other articles may be gradually brought to a desired predetermined temperature in an efficient and economical manner prior to being transferred into the primary tunnel structure.

A further object of the invention is to provide a tunnel kiln of the above character embodying so-called track cooling means located in the high temperature or firing zone of the primary tunnel structure and wherein means is employed for receiving heated air from the said track cooling means and utilizing it to assist in heating up the auxiliary heating zone of the said primary tunnel structure, the said heated air being subsequently caused to flow longitudinally through the primary tunnel structure and constituting the air supply for the gas burners used in heating the high temperature or firing zone.

Other objects and advantages of the invention will become more apparent during the course of the following description when taken in connection with the accompanying drawings.

Figure 8:
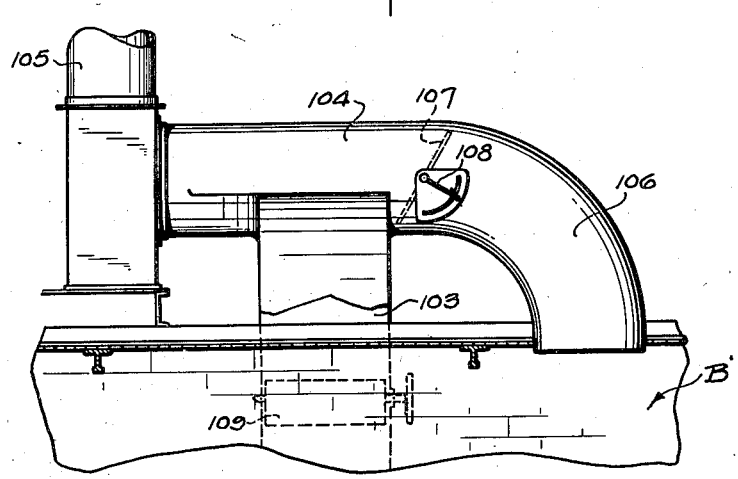

In the drawings wherein like numerals are employed to designate like parts throughout the same, Fig. 1 is a plan view of a tunnel kiln constructed in accordance with the present invention, Fig. 2 is a transverse section taken substantially on line 2—2 of Fig. 1, Fig. 3 is a transverse section through one of the combustion chambers showing the heating means therefor, Fig. 4 is a transverse section of the means for supplying air to the combustion chambers, Fig. 5 is a transverse section taken substantially on line 5—5 of Fig. 1, Fig. 6 is a side elevation of a portion of the primary tunnel structure, Fig. 7 is a transverse section taken substantially on line 7—7 of Fig. 1, and Fig. 8 is a longitudinal section taken substantially on line 8—8 of Fig. 1.

Referring now to the drawings and particularly to Fig. 1, the letter A designates in its entirety the primary tunnel structure wherein the maximum firing temperatures are attained and B the preheating tunnel structure wherein the pots or other articles being treated are first gradually brought to a desired predetermined temperature before being introduced into the primary tunnel structure.

The primary tunnel structure A and preheating tunnel structure B are arranged side by side in parallel relation relative to one another with the exit end of the preheating tunnel structure being disposed substantially opposite the intake end of the primary tunnel structure, to the end that the pots or other articles can be readily and quickly transferred from the former into the latter without any undue loss of heat and without being adversely affected by atmospheric conditions during the transfer.

As brought out above, the improved tunnel kiln herein provided has been primarily designed for use in the firing of refractory glass melting pots and will therefore be described and likewise illustrated in the drawings in this connection, although it is to be remembered that it may be also employed with equally satisfactory results in the treatment of other articles.

The pots to be fired are adapted to be carried first through the preheating tunnel structure B and thence through the primary tunnel structure A upon a series of traveling cars or trucks. One of these pots, designated by the numeral 10, is shown at the right in Fig. 1 in position to be introduced into the intake end of the preheating tunnel structure B, said pot being carried by a work car or truck 11 which is adapted to travel along rails 12 extending longitudinally through the tunnel structure. The pot is supported above the top of the work car upon a plurality of refractory blocks 13 to permit of the circulation of heated air beneath said pot. The work cars are mounted upon wheels 14 carried by axles 15 and which are adapted to run along the said rails 12.

The primary tunnel structure A is divided or separated into a high temperature or firing zone $a$ and an auxiliary heating zone $b$, the pots after being passed through the preheating tunnel structure B being introduced into and caused to pass first through the auxiliary heating zone $b$ of the primary tunnel structure and thence through the high temperature or firing zone $a$ thereof wherein the maximum heating temperatures are attained. Extending longitudinally through the primary tunnel structure A are the spaced rails 16 upon which the work cars travel.

The pots are adapted to be moved intermittently through the preheating tunnel structure and likewise through the primary tunnel structure, the introduction of one work car into either tunnel structure causing all of the preceding cars therein to be moved forwardly the length of one car, with the last car being discharged from the exit end of the respective tunnel structure.

Any suitable means may be provided for charging the cars or trucks 11 into the preheating tunnel structure B. One such means, illustrated by way of example in Fig. 1, comprises a cable 17 wound at one end about a drum 18 and provided at its free end with a hook 19 adapted to engage the car 11 as the cable is wound upon the drum and to pull the said car into the kiln, said cable being trained about suitable pulleys, one being shown at 20. The drum 18 may be driven by means of a chain and sprocket drive or the like 21 to effect the winding of the cable thereupon.

In order to effect the transfer of the work cars 11 from the outlet end of the preheating tunnel structure B to the intake end of the primary tunnel structure A, there is provided the transversely extending transfer track 22 upon which is mounted a transfer table 23, said table carrying rails 24 which are adapted to line up with the rails 12 and 16 which extend longitudinally through the preheating and primary tunnel structures respectively.

In practice, the introduction of one work car into the preheating tunnel structure will cause all of the preceding cars therein to be moved forwardly the length of one car, with the last car being discharged from the tunnel structure onto the transfer table 23, it being understood that the said transfer table has been previously moved into position where the rails 24 thereon are in alignment with the rails 12. The transfer table is then moved transversely along track 22 to bring the work car and pot into a substantially square receiving chamber 25 which may be located at the forward end of the primary tunnel structure. The rails 24 are brought into alignment with rails 16 whereupon the car carrying the pot can be moved from the transfer table into and through the primary tunnel structure. Any suitable means can be provided for charging the work cars into the primary tunnel structure. Likewise, if desired, the receiving chamber 25 may be omitted and the transfer table moved directly into the forward end of the auxiliary heating zone $b$.

With reference particularly to Fig. 2, the main heating zone $a$ of the primary tunnel structure A comprises opposite side walls 26 and 27 and a crown 28 forming a horizontal tunnel chamber 29 through which the pots 10 are carried. The bottom 30 of the tunnel chamber is built up at either side of the kiln to provide the longitudinally extending ledges or platforms 31 and 32 upon which are mounted the closed combustion chambers 33 and 34 respectively, said chambers being disposed at opposite sides of the pots 10 and extending longitudinally substantially the entire length of the chamber 29.

The combustion chambers 33 and 34 are elongated hollow structures having walls of fire clay, carborundum, or analogous refractory material. The means provided for heating each combustion chamber includes gas burners 35 and 36, the burner 35 being located at the end of the combustion chamber adjacent the outlet end 30 of the tunnel structure A, while the burner 36 is projected transversely into the combustion chamber at a point in advance of the burner 35 and through the side wall 26.

The flames from the burners are adapted to travel longitudinally through the combustion chambers in a direction opposite to the direction of travel of the pots, with the products of combustion passing from the said combustion chambers 33 and 34 through outlets 37 and 38 into conduits 39 and 40 respectively, said conduits extending longitudinally of the tunnel structure A and communicating at one end with a transverse pipe 41 projecting exteriorly of the tunnel structure and having connected thereto a pipe 42 leading to a stack 43 through which the waste gases may be exhausted to the atmosphere. Since the heating flames pass longitudinally through the combustion chambers from the outlet end of the main heating zone $a$ to the inlet end thereof, it will be seen that the temperature in this zone will increase gradually from the inlet end to the outlet end thereof.

The auxiliary heating zone $b$ of the primary tunnel structure is relatively narrower than the main heating zone $a$ and comprises spaced vertical side walls 44 and 45 and a flat top 46 (Fig. 5) defining a tunnel chamber 47 in alignment with tunnel chamber 29, the side walls of said auxiliary heating zone being of suitable refractory material and the top thereof of metal or asbestos.

In accordance with the present invention, a portion of the heated air within the main heating zone $a$ is adapted to be utilized to assist in heating the auxiliary heating zone $b$, and to this end there may be provided a conduit 48 communicating with the tunnel chamber 29 adjacent the inlet end thereof through the crown or arch 28, as best shown in Figs. 1 and 6. The heated air is withdrawn from said chamber by a pump 49 driven from a motor 50 and is then forced by said pump through a conduit 51 terminating in vertical branch pipes 52 and 53 respectively, communicating with horizontal pipes 54 and 55 extending longitudinally of the auxiliary heating zone at opposite sides thereof and from which lead outlets or flues 56 and 57 entering the tunnel chamber 47 adjacent the bottom thereof and beneath the pots 10. Associated with the flues 56 and 57 are dampers 58 and 59 respectively for regulating the heated air passing into the auxiliary heating zone, while the amount of heated air withdrawn from the main heating zone through the conduit 48 may be controlled by a damper 60.

By introducing the heated air into the auxiliary heating zone adjacent the bottom thereof and beneath the pots 10, the said air will be caused to circulate upwardly around the pots and in this way effect a more uniform heating thereof. Likewise, the feeding of the heated air into the tunnel chamber 47 adjacent the bottom thereof will result in a more even temperature condition therein from top to bottom thereof since the introduction of the air in this manner will cause a forced circulation within the tunnel chamber and minimize any tendency toward stratification of the heated air.

In order to prevent overheating of the rails 16 within the main heating zone a and also to prevent overheating of the running gear of the work cars 11, there are arranged at opposite sides of the path of travel of said cars a plurality of horizontal longitudinally extending pipes 61 and 62 respectively through which air is adapted to be circulated under pressure to effect the desired cooling of the said rails and running gear. These pipes are commonly termed "track cooling means" and it has been customary in the past to simply discharge the heated air from the pipes to the atmosphere, making no use thereof. The present invention, however, contemplates the utilization of the heated air within the track cooling pipes to assist in heating the auxiliary heating zone b. To this end, the pipes 61 and 62 each communicate at one end with a header 63 and connected with these headers is a pipe 64 extending transversely of the tunnel structure and communicating at one end with a conduit 65 extending longitudinally of said tunnel structure toward the inlet end thereof, the air being drawn through said conduit by a pump 66 operated by motor 67. Leading from pump 66 is a conduit 68 terminating in two substantially vertical branch pipes 69 and 70 which communicate with the horizontally disposed pipes 71 and 72 arranged at opposite sides of the auxiliary heating zone forwardly of and being similar to pipes 54 and 55. Each of the horizontal pipes 71 and 72 has associated therewith a plurality of outlets or flues 73 which communicate with the tunnel chamber 47 adjacent the bottom thereof and beneath pots 10. Each of the flues 73 is provided with a damper 74 to regulate the heated air passing therethrough into the tunnel chamber.

The amount of heated air drawn through the conduit 65 by pump 66 may be controlled by a damper 75 with the undesired or surplus air being shunted to the stack 43 through the pipe connection 77 between conduits 42 and 65, said pipe 77 having associated therewith a damper 76. Thus, by completely closing damper 75 and opening damper 76, it will be readily apparent that all of the heated air passing through conduit 65 will be directed through pipe 77 to stack 43, whereas upon closing of damper 76 and opening damper 75, the heated air will pass to the auxiliary heating zone. Any desired intermediate adjustment of the dampers 75 and 76 can of course be provided, depending upon the amount of heated air required.

It may be found desirable at times to supplement the heated air being drawn into the auxiliary heating zone through the conduit 65 and in order to provide for this additional heat, a pipe connection 78 is provided between the conduits 48 and 65 and within which connection is arranged a damper 79. By either partially or entirely opening this damper, a certain amount of heated air being drawn through conduit 48 will pass through pipe 78 into conduit 65 and thence to the auxiliary heating zone.

The heated air taken from the track cooling pipes 61 and 62 and introduced into the auxiliary heating zone b will tend to flow rearwardly through the primary tunnel structure in the direction of travel of the pots therethrough and constitutes the air supply for the gas burners 35 and 36. In other words, this air is utilized to support combustion of the flames from said burners. With the above in mind, each combustion chamber 33 and 34 terminates slightly short of the outer or rear end wall of the primary tunnel structure and disposed between the said combustion chamber and wall, in alignment with the former, is a chambered block 110 (Fig. 4) having a chamber 111 therein and an opening 112 at the top thereof controlled by a slidable damper 113. The heated air, after passing longitudinally through the tunnel structure, will pass through opening 112 into chamber 111, as indicated by the arrows in Fig. 4 and thence longitudinally into the respective combustion chamber.

The preheating tunnel structure B, which is relatively shorter than the primary tunnel structure A, comprises spaced vertical side walls 80 and 81 and a flat roof 82 cooperating to form a tunnel chamber 83 (Fig. 7), the side walls being of a suitable refractory material and the roof preferably of corrugated metal or asbestos carried upon a series of spaced transverse I-beams 84.

The preheating tunnel structure is adapted to be heated by the circulation of heated air longitudinally therethrough, this air being introduced into the tunnel chamber 83 adjacent the exit end thereof and withdrawn from the said chamber adjacent its inlet end so that the temperature within the tunnel chamber will increase gradually from the inlet end to the outlet end thereof to cause a gradual heating up of the pots as they are carried therethrough. The heating means comprises a heating unit 84 including a plurality of steam coils 85 arranged within a casing 86, air being blown through the casing and around the steam coils by the action of a fan or the like 87 driven from motor 88. As the air contacts the steam coils 85, it will of course be heated up, the heated air passing from casing 86 through a conduit 89 into the substantially vertical branch pipes 90 and 91 which communicate with the horizontal pipes 92 and 93 respectively arranged at opposite sides of the preheating tunnel structure and extending longitudinally thereof. The pipes 92 and 93 are provided with a plurality of outlets or flues 94 and 95 respectively which communicate with the tunnel chamber 83 preferably closely adjacent the bottom thereof and beneath pots 10. Arranged within each horizontal pipe 92 and 93 is a damper 96 for controlling the heated air passing therethrough and which may be manually operable by a lever 97.

Apparatus substantially similar to that described above for introducing the heated air into the tunnel chamber 83 may be provided for withdrawing the air from said chamber adjacent the opposite end thereof. Thus, there may be arranged at opposite sides of the preheating tunnel structure B, adjacent the inlet end thereof, the two longitudinally extending pipes 98 and 99 in communication with the tunnel chamber adjacent the bottom thereof through a plurality of horizontally spaced outlets or flues 100 and 101 respectively, each having associated therewith a damper (not shown) to regulate the rate of withdrawal of the air from said chamber. Leading from the pipes 98 and 99 are the vertical conduits 102 and 103 respectively communicating with a common conduit 104 running to a stack 105.

While it is preferred to withdraw the heated air from adjacent the bottom of the tunnel chamber, it may under some conditions be removed from the top thereof by extending the conduit 104 as at 106 and projecting it through the roof 82 of the preheating tunnel structure. Associated with the extension 106 is a damper 107 controlled by a lever 108, while associated with each vertical conduit 102 and 103 is a damper 109. By properly regulating the dampers 108 and 109, the heated air can be withdrawn in proper amounts either from the top of the tunnel chamber or from adjacent the bottom thereof.

The introduction of the heated air into the tunnel chamber 83 adjacent the bottom thereof and likewise the removal of the air from said chamber also adjacent the bottom thereof constitutes a very desirable and important feature of the present invention in that this particular arrangement lends itself to the maintenance of a much more even and uniform temperature condition within the preheating tunnel structure from the bottom to the top thereof. Thus, the introduction of the heated air into the tunnel chamber adjacent the bottom thereof results in a forced circulation of the air therein and reducing stratification of the heated air to a minimum. Likewise, the removal of the air from adjacent the bottom of the tunnel chamber results in the heated air, which normally rises to the top of the chamber, being drawn downwardly around the pots. Consequently, the pots will be evenly and uniformly heated as they are carried through the preheating tunnel chamber.

As pointed out above, in the operation of the improved tunnel kiln herein provided, the pots 10 to be treated are first passed through the preheating tunnel structure B and thence through the primary tunnel structure A, with the maximum firing temperatures being attained in the main heating zone a of the latter tunnel structure. Although this invention is of course not restricted to the use of any specific temperatures within different portions or zones of the tunnel kiln, yet it might be stated, by way of example only, that the temperature at the inlet end of the preheating tunnel structure may be in the neighborhood of 125 to 150 degrees Fahrenheit when firing glass melting pots, with the temperature at the outlet end thereof being approximately 300 to 350 degrees Fahrenheit. The temperature at the intake end of the primary tunnel structure A is preferably substantially the same as the temperature at the exit end of the preheating tunnel structure B, so that the pots will not be subjected to any great difference in temperature upon being transferred from the latter into the former. The pots, upon being passed through the primary tunnel structure, are gradually increased in temperature and the temperature at the exit end of said primary tunnel structure may be in the neighborhood of from 1925 to 1975 degrees Fahrenheit.

When the pots are removed from the kiln, they are adapted to be placed directly within a so-called pot furnace and to have molten glass produced therein. By the use of the apparatus herein provided, the pots can be gradually brought to the desired maximum temperature evenly and uniformly without danger of breaking, cracking, or weakening the same and so that they will be able to withstand the intense heat to which they are subjected during the melting of the glass therein. The pots must not only be heated to a high temperature but must also be thoroughly dried during the heating up thereof. Glass melting pots ordinarily contain a relatively large percentage of moisture and this moisture must be gradually removed without in any way adversely affecting the pots. For instance, a pot weighing approximately 2500 pounds will contain anywhere from 1% to 2% of moisture, meaning that the pot will contain 25 to 50 pounds of water which must be removed during the firing operation. The tunnel kiln herein provided will act to thoroughly dry and fire the pots in an efficient and practical manner. Also, the use of heated air from the main heating zone a and likewise from the track cooling means to effect the desired heating of the auxiliary heating zone b will tend to reduce fuel costs to a minimum.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a tunnel kiln construction, a tunnel structure including a main heating zone and an auxiliary heating zone in substantial alignment with one another, means for carrying the work to be treated through said zones, means for heating the main heating zone, and means for receiving a portion of the heat from said main heating zone and introducing it into opposite sides of the auxiliary heating zone adjacent the bottom thereof.

2. In a tunnel kiln construction, a tunnel structure including a main heating zone and an auxiliary heating zone in substantial alignment with one another, tracks extending longitudinally through said zones, work cars movable along said tracks and adapted to carry the work to be treated, track cooling means including a plurality of pipes extending longitudinally of the main heating zone and through which air under pressure is adapted to be passed, and means for receiving the heated air from said pipes and introducing it into said auxiliary heating zone to assist in heating the latter.

3. In a tunnel kiln construction, a tunnel structure including a main heating zone and an auxiliary heating zone in substantial alignment with one another, tracks extending longitudinally through said zones, work cars movable along said tracks and adapted to carry the work to be treated, track cooling means including a plurality of pipes extending longitudinally of the main heating zone and through which air under pressure is adapted to be passed, and means for receiving the heated air from said pipes and introducing it into opposite sides of the auxiliary heating zone adjacent the bottom thereof and beneath said work.

4. In a tunnel kiln construction, a tunnel structure including a main heating zone and an auxiliary heating zone in substantial alignment with one another, tracks extending longitudinally through said zones, work cars movable along said tracks and adapted to carry the work to be treated, means for heating the main heating zone, means for receiving a portion of the heat from said main heating zone and introducing it into said auxiliary heating zone to assist in heating the latter, track cooling means including a plurality of pipes extending longitudinally of the main heating zone and through which air under pressure is adapted to be passed, and means for receiving the heated air from said pipes and introducing it into the said auxiliary heating zone to also assist in the heating thereof.

5. In a tunnel kiln construction, a tunnel structure including a main heating zone and an auxiliary heating zone in substantial alignment with one another, tracks extending longitudinally through said zones, work cars movable along said tracks and adapted to carry the work to be treated, means for heating the main heating zone, means for receiving a portion of the heat from said main heating zone and introducing it into said auxiliary heating zone to assist in heating the latter, track cooling means including a plurality of pipes extending longitudinally of the main heating zone and through which air under pressure is adapted to be passed, and means for receiving the heated air from said pipes and introducing it into opposite sides of the auxiliary heating zone adjacent the bottom thereof and beneath said work to also assist in the heating of the latter.

6. In a tunnel kiln construction, a tunnel structure including a main heating zone and an auxiliary heating zone in substantial alignment with one another, tracks extending longitudinally through said zones, work cars movable along said tracks and adapted to carry the work to be treated, means for heating the main heating zone, means for receiving a portion of the heat from said main heating zone and introducing it into opposite sides of the auxiliary heating zone adjacent the bottom thereof and beneath said work to assist in heating the latter, track cooling means including a plurality of pipes extending longitudinally of the main heating zone and through which air under pressure is adapted to be passed, and means for receiving the heated air from said pipes and introducing it into said auxiliary heating zone to also assist in heating the latter.

7. In a tunnel kiln construction, a tunnel structure including a main heating zone and an auxiliary heating zone in substantial alignment with one another, tracks extending longitudinally through said zones, work cars movable along said tracks and adapted to carry the work to be treated, means for heating the main heating zone, means for receiving a portion of the heat from said main heating zone and introducing it into opposite sides of the auxiliary heating zone adjacent the bottom thereof and beneath said work to assist in heating the latter, track cooling means including a plurality of pipes extending longitudinally of the main heating zone and through which air under pressure is adapted to be passed, and means for receiving the heated air from said pipes and introducing it into opposite sides of the auxiliary heating zone adjacent the bottom thereof and beneath said work to also assist in heating the latter.

8. In a tunnel kiln construction, a tunnel structure including side walls and a top cooperating to define a longitudinally extending tunnel chamber, means for carrying the work to be treated through said chamber, means for introducing heated air into opposite sides of the chamber adjacent the bottom thereof beneath said work and also adjacent its exit end, and means for withdrawing the air from said chamber adjacent the inlet end thereof.

9. In a tunnel kiln construction, a tunnel structure including side walls and a top cooperating to define a longitudinally extending tunnel chamber, means for carrying the work to be treated through said chamber, means for introducing heated air into the chamber adjacent the exit end thereof, and means for withdrawing the air from opposite sides of the chamber adjacent the bottom thereof beneath said work and also adjacent its inlet end.

10. In a tunnel kiln construction, a tunnel structure including side walls and a top cooperating to define a longitudinally extending tunnel chamber, means for carrying the work to be treated through said chamber, means for introducing heated air into opposite sides of the chamber adjacent the bottom thereof beneath said work and also adjacent its exit end, and means for withdrawing the air from opposite sides of the chamber also adjacent the bottom thereof beneath said work and adjacent its inlet end.

11. In a tunnel kiln construction, a primary tunnel structure and a preheating tunnel structure arranged alongside one another, with the outlet end of said preheating tunnel being disposed substantially opposite the inlet end of said primary tunnel structure, means for carrying the work to be treated through said tunnel structures, said primary tunnel structure including a main heating zone and an auxiliary heating zone, means for heating the main heating zone, means for receiving a portion of the heat from said main heating zone and feeding it into said auxiliary heating zone to assist in heating the latter, and separate means for heating the preheating tunnel structure.

12. In a tunnel kiln construction, a primary tunnel structure and a preheating tunnel structure arranged alongside one another, with the outlet end of said preheating tunnel being disposed substantially opposite the inlet end of said primary tunnel structure, means for carrying the work to be treated through said tunnel structures, said primary tunnel structure including a main heating zone and an auxiliary heating zone, means for heating the main heating zone, means for receiving a portion of the heat from said main heating zone and feeding it into opposite sides of the auxiliary heating zone adjacent the bottom thereof beneath said work, and separate means for heating the preheating tunnel structure.

13. In a tunnel kiln construction, a primary tunnel structure and a preheating tunnel structure arranged alongside one another, with the outlet end of said preheating tunnel structure being disposed substantially opposite the inlet end of said primary tunnel structure, means for carrying the work to be treated through said tunnel structures, means for heating the primary tunnel structure, means independent of said heating means for introducing heated air into the preheating tunnel structure adjacent the outlet end thereof, and means for withdrawing the air from said preheating tunnel structure adjacent the inlet end thereof.

14. In a tunnel kiln construction, a primary tunnel structure and a preheating tunnel structure arranged alongside one another, with the outlet end of said preheating tunnel structure being disposed substantially opposite the inlet end of said primary tunnel structure, means for carrying the work to be treated through said tunnel structures, means for heating the primary tunnel structure, means independent of said heating means for introducing heated air into opposite sides of the preheating tunnel structure adjacent the bottom thereof beneath said work and also adjacent its exit end, and means for withdrawing the air from opposite sides of the said preheating tunnel structure also adjacent the bottom thereof beneath said work and adjacent its inlet end.

15. In a tunnel kiln construction, a primary tunnel structure and a preheating tunnel structure arranged alongside one another, with the outlet end of said preheating tunnel being disposed substantially opposite the inlet end of said primary tunnel structure, means for carrying the work to be treated through said tunnel structures, said primary tunnel structure including a main heating zone and an auxiliary heating zone, means for heating the main heating zone, means for receiving a portion of the heat from said main heating zone and feeding it into said auxiliary heating zone to assist in heating the latter, means independent of said heating means for introducing heated air into the preheating tunnel structure adjacent the outlet end thereof, and means for withdrawing the air from said preheating tunnel structure adjacent the inlet end thereof.

16. In a tunnel kiln construction, a primary tunnel structure and a preheating tunnel structure arranged alongside one another, with the outlet end of said preheating tunnel being disposed substantially opposite the inlet end of said primary tunnel structure, means for carrying the work to be treated through said tunnel structures, said primary tunnel structure including a main heating zone and an auxiliary heating zone, means for heating the main heating zone, means for receiving a portion of the heat from said main heating zone and introducing it into opposite sides of the auxiliary heating zone adjacent the bottom thereof beneath said work to assist in heating the latter, means independent of said heating means for introducing heated air into oposite sides of the preheating tunnel structure adjacent the bottom thereof and also adjacent its exit end, and means for withdrawing the air from opposite sides of said preheating tunnel structure also adjacent the bottom thereof beneath said work and adjacent its inlet end.

17. In a tunnel kiln construction, a tunnel structure including a main heating zone and an auxiliary heating zone in substantial alignment with one another, tracks extending longitudinally through said zones, work cars movable along said tracks and adapted to carry the work to be treated, closed combustion chambers extending longitudinally of the main heating zone at opposite sides thereof, gas burners for introducing flames into the combustion chambers adjacent the outlet end of the main heating zone, a stack, means for receiving the products of combustion from said combustion chambers and delivering them to said stack, track cooling means including a plurality of pipes extending longitudinally of the main heating zone and through which air under pressure is adapted to be passed, means for receiving the heated air from said pipes and introducing it into the said auxiliary heating zone to assist in the heating thereof, and damper controlled connections between said last-mentioned means and stack whereby a portion of the heated air from the track cooling means may be passed to the stack if and when desired.

18. In a tunnel kiln construction, a tunnel structure including a main heating zone and an auxiliary heating zone in substantial alignment with one another, tracks extending longitudinally through said zones, work cars movable along said tracks and adapted to carry the work to be treated, means for heating the main heating zone, means for receiving a portion of the heat from said heating zone and introducing it into said auxiliary heating zone to assist in heating the latter, track cooling means including a plurality of pipes extending longitudinally of the main heating zone and through which air under pressure is adapted to be passed, means for receiving the heated air from said pipes and introducing it into said auxiliary heating zone to also assist in the heating of the latter, and damper controlled connections between the means for receiving a portion of the heat from said main heating zone and the means for receiving the heated air from said pipes so that a portion of the heat from the former may be passed to the latter if and when desired.

19. In a tunnel kiln construction, a tunnel structure including a main heating zone and an auxiliary heating zone in substantial alignment with one another, tracks extending longitudinally through said zones, work cars movable along said tracks and adapted to carry the work to be treated, closed combustion chambers extending longitudinally of the main heating zone at opposite sides thereof, gas burners for introducing flames into the combustion chambers adjacent the outlet end of the main heating zone, a stack, means for receiving the products of combustion from said combustion chambers and delivering them to said stack, means for receiving a portion of the heat from said main heating zone and introducing it into the auxiliary heating zone to assist in heating the latter, track cooling means including a plurality of pipes extending longitudinally of the main heating zone and through which air under pressure is adapted to be passed, means for receiving the heated air from said pipes and introducing it into the auxiliary heating zone to also assist in heating the latter, damper controlled connections between said last-mentioned means and stack whereby a portion of the heated air from the track cooling means may be passed to the stack if and when desired, and damper controlled connections between the means for receiving a portion of the heat from the main heating zone and the means for receiving the heated air from said pipes whereby heat may be passed from the former to the latter if and when desired.

JOHN J. SCHARF.
WILLIAM HASSELBACH.
LUTHER T. STROMMER.